United States Patent [19]

Brunner et al.

[11] Patent Number: 5,650,464
[45] Date of Patent: Jul. 22, 1997

[54] PROCESS FOR THE PREPARATION OF STABILIZED OLEFIN POLYMERS

[75] Inventors: Martin Brunner, Marly; Bruno Rotzinger, Birsfelden; Thomas Schmutz, Riehen; Werner Stauffer, Fribourg, all of Switzerland

[73] Assignee: Ciba-Geigy Corporation, Tarrytown, N.Y.

[21] Appl. No.: 548,838

[22] Filed: Oct. 26, 1995

[30] Foreign Application Priority Data

Nov. 3, 1994 [CH] Switzerland ............... 3285/94

[51] Int. Cl.$^6$ ............... C08K 5/3492; C08K 5/3435
[52] U.S. Cl. ............... 524/700; 524/132; 524/707; 524/720; 524/740; 524/741; 524/99; 524/100; 524/102
[58] Field of Search ............... 524/132, 707, 524/720, 740, 741, 700, 99, 100, 102

[56] References Cited

U.S. PATENT DOCUMENTS

| | | | |
|---|---|---|---|
| 4,383,066 | 5/1983 | Sugio et al. | 524/132 |
| 5,045,577 | 9/1991 | Mülhaupt et al. | 524/99 |
| 5,244,948 | 9/1993 | Mülhaupt et al. | 524/99 |
| 5,276,066 | 1/1994 | Paulik et al. | 524/707 |
| 5,276,076 | 1/1994 | Pastor et al. | 524/119 |
| 5,326,802 | 7/1994 | Pastor et al. | 524/119 |
| 5,334,739 | 8/1994 | Pastor et al. | 558/78 |
| 5,344,860 | 9/1994 | Pastor et al. | 524/119 |
| 5,373,040 | 12/1994 | Pastor et al. | 524/119 |

FOREIGN PATENT DOCUMENTS

| | | |
|---|---|---|
| 0192987 | 9/1986 | European Pat. Off. . |
| 0254348 | 1/1988 | European Pat. Off. . |

*Primary Examiner*—Kriellion S. Morgan
*Attorney, Agent, or Firm*—Luther A. R. Hall; David Crichton

[57] ABSTRACT

The invention relates to a process for the preparation of olefin polymers by polymerization using a transition metal catalyst with the addition of an aminoalkyl-1,1'-biphenyl-2, 2'-diylphosphite or aminoalkyl-2,2'-alkylidene-bis(phenyl) phosphite, in conjunction with optional further modifiers. The polymers obtainable in this manner have excellent long-term stability.

12 Claims, No Drawings

PROCESS FOR THE PREPARATION OF STABILIZED OLEFIN POLYMERS

The present invention relates to a process for the preparation of stabilised olefin polymers in which a stabiliser and optional further modifiers are added during the polymerisation. The invention also relates to the olefin polymers so obtained.

The low-pressure polymerisation of olefins with organometallic complex catalysts (e.g. Ziegler-Natta catalysts) usually results in a freely powdered polymer which is extruded in an extruder before being shaped by processing. In this granulation, substances such as stabilisers, corrosion inhibitors, colour enhancers, antistatic agents or other processing auxiliaries are added to the polymer. However, this granulation is not always desired or possible, e.g. when using high molecular weight polymers.

Recently, it has proved possible by using transition metal catalysts (solid supported catalysts) to prepare spherical, granular-type polymers that no longer have to be granulated by extrusion, but can be processed direct.

As the polymers so obtained no longer have to be granulated, it was then desired to add modifiers which are important for processing and long-term stability during polymerisation. Such modifiers also include those modifiers which inhibit the corrosive action of the polymer on metal surfaces which is generally attributed to catalyst residues or degradation products of the catalyst system.

It is known (EP-A-192 987 or U.S. Pat. No. 5,244,948) that sterically hindered amine stabilisers of the polyalkylpiperidine type do not interfere with the polymersation and do not substantially discolour the polymer and effect good thermal oxidative stability.

It has further been proposed (EP-A-254 348) to add organic phosphites or phosphonites during polymerisation as antioxidants.

It is also known to add sterically hindered amine stabilisers of the polyalkylpiperidine type in conjunction with organic phosphites or phosphonites during th polymerisation (U.S. Pat. No. 5,045,577).

Surprisingly, it has now been found that the addition of aminoalkyl-1,1'-biphenyl-2,2'-diylphosphites or aminoalkyl-2,2'-alkylidene-bis(phenyl)phosphites, in conjunction with optional further modifiers, does not interfere with the polymerisation of olefins and that excellent long-term stability of the polymer is achieved. To be highlighted is the good colour retention of the polymer in contact with water.

Accordingly, the invention relates to a process for the preparation of olefin polymers by polymerisation using transition metal catalysts, which comprises carrying out the polymerisation by adding at least one compound of formula

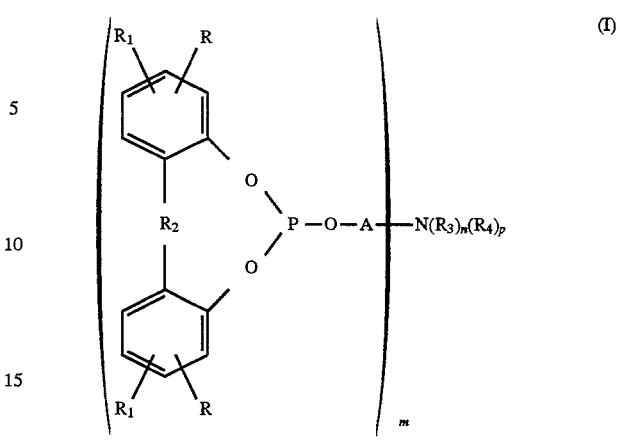

wherein
n=1 and p=1, if m=1;
n=1 and p=0, if m=2;
and n and p=0, if m=3;
and wherein R is an alkyl group of 1 to 18 carbon atoms;
$R_1$ is hydrogen or an alkyl group of 1 to 18 carbon atoms;
$R_2$ is a direct bond or alkylene of 1 to 12 carbon atoms;
A is alkylene of 1 to 6 carbon atoms, or cycloalkylene of 5 or 6 carbon atoms;
$R_3$ is alkyl of 1 to 18 carbon atoms, or

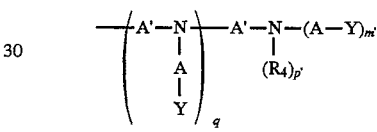

wherein Y is

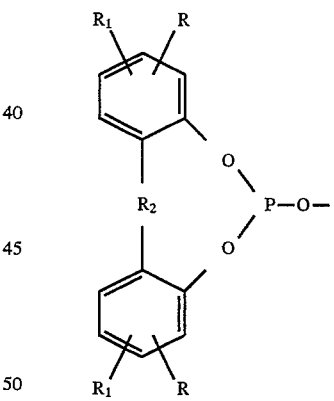

and A' is alkylene of 1 to 6 carbon atoms, or cycloalkylene of 5 or 6 carbon atoms;
m' is 1 or 2;
p' is 0 or 1; and
q is 0 to 5; and
A, R, $R_1$ and $R_2$ have the meaning given above, with the proviso that, if p, p' and q are 0, then —N—A'—N is a diazacycloalkyl group containing 2 to 10 carbon atoms or, if m is 1 and p is 0, then N—$R_3$ is an azacycloalkyl group containing 2 to 10 carbon atoms or an azaoxacycloalkyl group containing 3 to 7 carbon atoms;

and $R_4$ is alkyl of 1 to 18 carbon atoms.

Preferred compounds in the scope of the above constitution are those, wherein R in the phenyl ring is in ortho-position to the oxygen.

The R and $R_1$ groups are preferably straight-chain or branched alkyl of 4 to 8 carbon atoms, typically n-butyl, sec-butyl, tert-butyl, tert-pentyl, 2-ethylhexyl, n-octyl and 1,1,3,3,-tetramethylbutyl. Particularly preferred groups are tert-butyl, tert-pentyl and 1,1,3,3-tetramethylbutyl. Furthermore, the $R_1$ group is particularly preferably in the para-position to the oxygen, in particular when $R_1$ is tert-alkyl.

$R_1$ may be hydrogen or alkyl of 1 to 18 carbon atoms, but is preferably an alkyl group of 1 to 8 carbon atoms which is either straight-chain or branched. Tert-alkyl of 4 to 8 carbon atoms is particularly preferred.

$R_2$ is preferably a direct bond or alkylene of formula

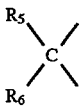

wherein $R_5$ and $R_6$ are each independently of the other hydrogen, alkyl of 1 to 7 carbon atoms, or aryl, with the proviso that the total number of carbon atoms is no higher than 12. Typical aryl groups are, inter alia, phenyl, tolyl, mesityl, xylyl as well as 1-napthyl and 2-naphthyl.

$R_2$ is particularly preferably a direct bond, methylene or ethylidene.

$R_3$ and R4 are preferably alkyl of 1 to 4 carbon atoms.

A is preferably ethylene or trimethylene.

Compounds of formula (I) are particularly preferred, wherein m is 1, 2 or 3; R is $C_1$–$C_4$alkyl; $R_1$ is $C_1$–$C_8$alkyl; $R_2$ is a direct bond, methylene or ethylidene; and $R_3$ and $R_4$ are $C_1$–$C_4$alkyl.

Novel compounds which are very particularly preferred are N-methyliminodiethanol-bis-(3,3',5,5'-tetra-tert-butyl-1,1'-biphenyl-2,2'-diyl)phosphite and, in particular, 2,2',2''-nitrilotriethanol-tris(3,3',5,5'-tetra-tert-butyl-1,1'-biphenyl-2,2'-diyl)phosphite.

Normally 0.005 to 0.5% by weight, preferably 0.02 to 0.2% by weight, of aminoalkyl-1,1'-biphenyl-2,2'-diylphosphite or aminoalkyl-2,2'-alkylidene-bis(phenyl) phosphite are used, based on the polymer.

The olefins which can be polymerised by this process are ethylene and α-olefins, typically propylene, 1-butene, 4-methylpent-1-ene, 5-methylhex-1-ene or styrene, as well as mixtures of olefins, e.g. ethylene/propylene or propylene in admixture with minor mounts of higher α-olefins. In this process, $C_2$olefins or $C_3$olefins as well as their copolymers and styrene are preferred. This process is of particular interest for the polymerisation and copolymerisation of ethylene and propylene, in particular for high molecular weight PE or PP. High molecular weight PE will be understood to mean PE of high molecular weight, i.e. having a MW higher than 250000 or a melt index smaller than 1 g/10 min at 5 kg and 190° C.

The polymerisation catalysts employed are transition metal catalysts. In addition to the Ziegler catalysts, solid supported catalysts may also be preferably used. Suitable supported catalysts typically consist of a compound of a transition metal (such as an element of the 4th auxiliary group e.g. titanium, zirconium or hafnium, or also chromium) and a solid support (typically a magnesium halide, aluminium oxide or silicium dioxide).

Solid supported catalysts of an element of the 4th auxiliary group typically consist of an anhydrous magnesium dihalide in active form and an titanium compound. Catalysts with the other metals of the 4th auxiliary group (Zr and Hf) are also suitable. By magnesium dihalide in active form is meant one in whose X-ray spectrum the line of strongest reflectivity is broader than the corresponding line in the spectrum of the inactive magnesium dihalide. It is preferred to use magnesium dichloride or magnesium dibromide as magnesium halide. The titanium compound preferably contains at least one titanium-halogen bond. It is particularly preferred to use titanium tetrachloride. The titanium compound can be used in conjunction with an electrone donor, typically a carboxylic acid ester, as disclosed in EP-A-0 045 977, or an aliphatic ether, as disclosed in EP-A-0 361 494. After reaction of the magnesium dihalide component with the titanium compound and, where appropriate, with the electron donor, excess titanium compound und excess electron donor are conveniently washed off with an inert solvent, typically with hexane or heptane. The catalyst so prepared is activated by reaction with an aluminium compound which carries at least one alkyl group and is used preferably as a solution in an alkane. Illustrative examples of suitable aluminium alkyls are $Al(C_2H_5)_3$ or $Al(C_4H_9)_3$. It is possible to use an electron donor as co-activator, conveniently an organic silicium compound that contains at least one Si—O—C bond, as disclosed in EP-A-0045 977. Typical examples of such silicium compounds are phenyl triethoxysilane, phenyl trimethoxysilane, diphenyl dimethoxysilane, methyl triethoxysilane, dimethyl diethoxysilane, ethyl trimethoxysilane, cyclohexyl triethoxysilane, dicyclohexyl diethoxysilane, cyclohexyl trimethoxysilane or dicyclohexyl dimethoxysilane.

Further transition metal catalysts consist, for example, of a chromium compound coated onto a solid. support, e.g. an aluminium oxide or silicium dioxide, or mixtures thereof. Illustrative examples of such catalysts, which are also termed Phillips catalysts, may be found in U.S. Pat. No. 2,825,721. Silica gel having a large pore volume and large surface (e.g. Davison Chemical Division grade 952) is charged with a chromium salt solution (e.g. chromium trichloride or chromium trioxide in water). The amount of chromium is calculated such that the silica gel is coated with about 0.1 to 3% of chromium (preferably about 1% of chromium), and the amount of water employed corresponds to the pore volume of the silica gel. Besides silica gel further supports may be used, typically alumina, aluminasilica, aluminium phosphates (EP 215 336, W.R.Grace & Co.), and their surfaces can be modified (e.g.fluorine-containing supports, U.S. Pat. No. 4,011,382, Union Carbide). The form of these supports is such that after activation with dry air or oxygen their surface is larger than 50 m²/g and their pore volume is larger than 0.5 ml/g. It is also possible to use chromium/titanium or chromium/iron instead of a pure chromium compound (U.S. Pat. No. 4,011,382, Union Carbide, DE 2 210 959, U.S. Pat. No. 4,041,224, Chemplex Co.). The supports coated with chromium are normally activated in dry air or oxygen in the temperature range from 500° to C. 1000° C., preferably from 700° to 900° C. It is supposed that the chromium compound is then obtained as chromium VI. After being treated with oxygen, these catalysts can be activated with CO or ethylene. Activation is carried out below the temperature of 500° C., preferably in the range from 200° to 350° C. During activation, the chromium compound is reduced to chromium II to IV. The catalysts activated in this manner have no induction time. If no such activation takes place, the activation is carried out during the polymerisation. During the batch process, an induction time is often observed. The active chromium compound can also be coated onto a support as chromorganic compound, e.g. chromocene dichloride (W. L. Carrick, et at., J. Polym. Sci., A1, 10, 2609–2620 (1972), F. J. Karol, et al., J. Polym. Sci., A1, 10, 2621–2637 (1972), DE 280 2517, U.S. Pat. No. 3,709,853, DE 2,742,543, Union Carbide).

The polymerisation using these catalysts can be carried out by known methods in liquid or gaseous phase. The liquid phase can be e.g. an aliphatic hydrocarbon or the liquid monomer itself.

In the practice of this invention the aminoalkyl-1,1'-biphenyl-2,2'-diylphosphites or aminoalkyl-2,2'-alkylidene-bis(phenyl)phosphites are added to the polymerisation medium at the beginning, during or towards the end of the polymerisation. During the batch polymerisations said compounds and further optional modifiers are preferably added at the beginning. During the continuous polymerisations, which are often carried out large-scale, said compounds and optional further modifiers are also added continuously, either separately or together with the monomers.

The novel process is preferably carried out using additional stabilisers.

A particularly preferred embodiment of the invention comprises carrying out the above process with the further addition of at least one compound which contains at least one 2,2,6,6-tetramethylpiperidine radical, or with the further addition of an antioxidant of the sterically hindered phenol type. It is particularly preferred to use such a 2,2,6,6-tetramethylpiperidine compound together with a phenol.

Besides using the indicated preferred stabilisers which can be further added, the polymerisation can also be carried out by the addition of at least one compound of the series of the hydrotalcites, zeolites, metal soaps, metal carbonates or metal oxides which does not release water under the reaction conditions.

The sterically hindered amines, preferably piperidines, are known in particular as light stabilisers, but they act here also as antioxidants, i.e. they impart thermal oxidative stability to the polymer. These compounds contain one or more than one group of formula I

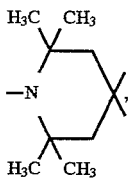
(I)

They may be compounds of relatively low molecular weight (<700) or of higher molecular weight. In this latter case they may also be oligomeric or polymeric compounds.

Particularly important stabilisers are the following classes of tetramethylpiperidines:

a) compounds of formula II

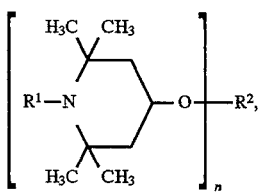
(II)

wherein n is a number from 1 to 4, preferably 1 or 2, $R^1$ is hydrogen, oxyl, $C_1$–$C_{12}$alkyl, $C_3$–$C_8$alkenyl, $C_3$–$C_8$alkynyl, $C_7$–$C_{12}$aralkyl, $C_1$–$C_8$alkanoyl, $C_3$–$C_5$alkenoyl, glycidyl or a group —$CH_2CH(OH)$—Z, wherein Z is hydrogen, methyl or phenyl, the preferred meaning of $R^1$ being $C_1$–$C_4$alkyl, allyl, benzyl, acetyl or acryloyl, and $R^2$, if n is 1, is hydrogen, $C_1$–$C_{18}$alkyl which may be interrupted by one or more than one oxygen atom, cyanoethyl, benzyl, glycidyl, a monovalent radical of an aliphatic, cycloaliphatic, araliphatic, unsaturated or aromatic carboxylic acid, carbamic acid or or phosphorus containing acid, or is a monovalent silyl radical, preferably a radical of an aliphatic carboxylic acid of 2 to 18 carbon atoms, of a cycloaliphatic carboxylic acid of 7 to 15 carbon atoms, of an α,β-unsaturated carboxylic acid of 3 to 5 carbon atoms or of an aromatic carboxylic acid of 7 to 15 carbon atoms, and, if n is 2, is $C_1$–$C_{12}$alkylene, $C_4$–$C_{12}$alkenylene, xylylene, a divalent radical of an aliphatic, cycloaliphatic, araliphatic or aromatic dicarboxylic acid, dicarbamic acid or phosphorus containing acid, or is a divalent silyl radical, preferably a radical of an aliphatic dicarboxylic acid of 2 to 36 carbon atoms, of a cycloaliphatic or aromatic dicarboxylic acid of 8 to 14 carbon atoms, or of an aliphatic, cycloaliphatic or aromatic dicarbamic acid of 8 to 14 carbon atoms, and, if n is 3, is a trivalent radical of an aliphatic, cycloaliphatic or aromatic tricarboxylic acid, of an aromatic tricarbamic acid or of a phosphorus containing acid, or is a trivalent silyl radical, and, if n is 4, is a tetravalent radical of an aliphatic, cycloaliphatic or aromatic tetracarboxylic acid.

Substituents defined as $C_1$–$C_{12}$alkyl may typically be methyl, ethyl, n-propyl, n-butyl, sec-butyl, tert-butyl, n-hexyl, n-octyl, 2-ethylhexyl, n-nonyl, n-decyl, n-undecyl or n-dodecyl dar.

$R^2$ as $C_1$–$C_{18}$alkyl may be the groups listed above and may additionally be n-tridecyl, n-tetradecyl, n-hexadecyl or n-octadecyl.

$R^1$ as $C_3$–$C_8$alkenyl may typically be 1-propenyl, allyl, methallyl, 2-butenyl, 2-pentenyl, 2-hexenyl, 2-octenyl, 4-tert-butyl-2-butenyl.

$R^1$ as $C_3$–$C_8$alkynyl is preferably propargyl.

$R^1$ as $C_7$–$C_{12}$aralkyl is preferably phenethyl and, most preferably, benzyl.

$R^1$ as $C_1$–$C_8$alkanoyl is typically formyl, propionyl, butyryl, octanoyl, but is preferably acetyl and, as $C_3$–$C_5$alkenoyl, is preferably acryloyl.

$R^2$ defined as a monovalent radical of a carboxylic acid is typically the radical of acetic acid, capronic acid, stearic acid, acrylic acid, methacrylic acid, benzoic acid or β-(3,5-di-tert-butyl-4-hydroxyphenyl)propionic acid.

$R^2$ defined as a divalent radical of a dicarboxylic acid is typically the radical of malonic acid, succinic acid, glutaric acid, adipic acid, suberic acid, sebacic acid, maleic acid, phthalic acid, dibutylmalonic acid, dibenzylmalonic acid, butyl-(3,5-di-tert-butyl-4-hydroxybenzyl)malonic acid or bicycloheptendicarboxylic acid.

$R^2$ defined as a trivalent radical of a tricarboxylic acid is typically the radical of trimellitic acid or of nitrilotriacetic acid.

$R^2$ defined as a tetravalent radical of a tetracarboxylic acid is typically the tetravalent radical of butane-1,2,3,4-tetracarbooxylic acid or of pyromellitic acid.

$R^2$ defined as a divalent radical of a dicarbamic acid is typically the radical of hexamethylenedicarbamic acid or of 2,4-toluylenedicarbamic acid.

Illustrative examples of polyalkylpiperidine compounds of this class are the following compounds:

1) 4-hydroxy-2,2,6,6-tetramethylpiperidine
2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine 8) 1,2,2,6,6-pentamethylpiperidin-4-yl-β-(3,5-di-tert-butyl-4-hydroxyphenyl)propionate
9) bis(1-benzyl-2,2,6,6-tetramethylpiperidin-4-yl)maleate
10) bis(2,2,6,6-tetramethylpiperidin-4-yl)succinate
11) bis(2,2,6,6-tetramethylpiperidin-4-yl)glutarate
12) bis(2,2,6,6-tetramethylpiperidin-4-yl)adipate
13) bis(2,2,6,6-tetramethylpiperidin-4-yl)sebacate
14) bis(1,2,2,6,6-pentamethylpiperidin-4-yl)sebacate
15) bis(1,2,3,6-tetramethyl-2,6-diethyl-piperidin-4-yl) sebacate
16) bis(1-allyl-2,2,6,6-tetramethylpiperidin-4-yl)phthalate
17) 1-propargyl-4-β-cyanoethyloxy-2,2,6,6-tetramethylpiperidine
18) 1-acetyl-2,2,6,6-tetramethylpiperidin-4-ylacetate
19) tris(2,2,6,6-tetramethylpiperidin-4-yl) trimellitate
20) 1-acryloyl-4-benzyloxy-2,2,6,6-tetramethylpiperidine
21) bis(2,2,6,6-tetramethylpiperidin-4-yl) diethylmalonate
22) bis(1,2,2,6,6-pentamethylpiperidin-4-yl) dibutylmalonate
23) bis(1,2,2,6,6-pentamethylpiperidin-4-yl) butyl-(3,5-di-tert-butyl-4-hydroxybenzyl) malonate
24) bis(1,2,2,6,6-pentamethylpiperidin-4-yl) dibenzylmalonate
25) bis(1,2,3,6-tetramethyl-2,6-diethylpiperidin-4-yl) dibenzylmalonate
26) hexane-1',6'-bis(4-carbamoyloxy-1-n-butyl-2,2,6,6-tetramethylpiperidine)
27) toluene-2',4'-bis(4-carbamoyloxy-1-n-propyl-2,2,6,6-tetramethylpiperidine)
28) dimethylbis(2,2,6,6-tetramethylpiperidin-4-oxy)silane
29) phenyltris(2,2,6,6-tetramethylpiperidin-4-oxy)silane
30) tris(1-propyl-2,2,6,6-tetramethylpiperidin-4-yl) phosphite
31) tris(1-propyl-2,2,6,6-tetramethylpiperidin-4-yl) phosphate
32) phenyl[bis(1,2,2,6,6-pentamethylpiperidin-4-yl)] phosphonate
33) 4-hydroxy-1,2,2,6,6-pentamethylpiperidine
34) 4-hydroxy-N-hydroxyethyl-2,2,6,6-tetramethylpiperidine
35) 4-hydroxy-N-(2-hydroxypropyl)-2,2,6,6-tetramethylpiperidine
36) 1-glycidyl-4-hydroxy-2,2,6,6-tetramethylpiperidine.
b) Compounds of formula (III)

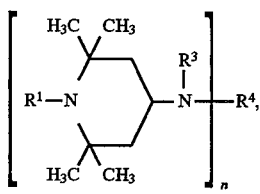

wherein n is 1 or 2, $R^1$ is as defined under a), $R^3$ is hydrogen, $C_1$–$C_{12}$alkyl, $C_2$–$C_5$hydroxyalkyl, $C_5$–$C_7$cycloalkyl, $C_7$–$C_8$aralkyl, $C_2$–$C_{18}$alkanoyl, $C_3$–$C_5$alkenoyl or benzoyl and, $R^4$, if n is 1, is hydrogen, $C_1$–$C_{18}$alkyl, $C_3$–$C_8$alkenyl, $C_5$–$C_7$cycloalkyl, $C_1$–$C_4$alkyl which is substituted by a hydroxyl, cyano, alkoxycarbonyl or carbamido group, glycidyl, a group of formula —$CH_2$—CH(OH)—Z or of formula —CONH—Z, wherein Z is hydrogen, methyl or phenyl; or, if n is 2, $R^4$ is $C_2$–$C_{12}$alkylene, $C_6$–$C_{12}$arylene, xylylene, a —$CH_2$—CH(OH)—$CH_2$ group or a —$CH_2$—CH(OH)—$CH_2$—O—D—O— group, wherein D is $C_2$–$C_{10}$alkylene, $C_6$–$C_{15}$arylene, $C_6$–$C_{12}$cycloalkylene, or, with the proviso that $R^3$ is not alkanoyl, alkenoyl or benzoyl, $R^4$ is also a divalent radical of an aliphatic, cycloaliphatic or aromatic dicarboxylic acid or dicarbamic acid or may also be the —CO— group, or $R^3$ and $R^4$, when taken together, if n is 1, may be the divalent radical of an aliphatic, cycloaliphatic or aromatic 1,2- or 1,3-dicarboxylic acid.

Substituents defined as $C_1$–$C_{12}$alkyl or $C_1$–$C_{18}$alkyl have the meanings already given under a).

Substiutents defined as $C_5$–$C_7$cycloalkyl are preferably cyclohexyl.

$R^3$ as $C_7$–$C_8$aralkyl is preferably phenylethyl or, most preferably, benzyl. $R^3$ as $C_2$–$C_5$hydroxyalkyl is preferably 2-hydroxyethyl or 2-hydroxypropyl.

$R^3$ as $C_2$–$C_{18}$alkanoyl is typically propionyl, butyryl, octanoyl, dodecanoyl, hexadecanoyl, octadecanoyl, but is preferably acetyl and, as $C_3$–$C_5$alkenoyl, is preferably acryloyl.

$R^4$ as $C_2$–$C_8$alkenyl is typically allyl, methallyl, 2-butenyl, 2-pentenyl, 2-hexenyl or 2-octenyl.

$R^4$ as $C_1$–$C_4$alkyl which is substituted by a hydroxyl, cyano, alkoxycarbonyl or carbamido group typically includes 2-hydroxyethyl, 2-hydroxypropyl, 2-cyanoethyl, methoxycarbonylmethyl, 2-ethoxycarbonylethyl, 2-aminocarbonylpropyl or 2-(dimethylcarbamoyl) ethyl.

Substituents defined as $C_2$–$C_{12}$alkylene may typically be ethylene, propylene, 2,2-dimethylpropylene, tetramethylene, hexamethylene, octamethylene, decamethylene or dodecamethylene.

Substituents defined as $C_6$–$C_{15}$arylene may typically be o-, m- or p-phenylene, 1,4-naphthylene or 4,4'-diphenylene.

D as $C_6$–$C_{12}$cycloalkylene is preferably cyclohexylene.

Illustrative examples of polyalkylpiperidine compounds of this class are the following compounds:

37) N,N'-bis(2,2,6,6-tetramethylpiperidin-4-yl)-hexamethylene-1,6-diamine
38) N,N'-bis(2,2,6,6-tetramethylpiperidin-4-yl)-hexamethylene-1,6-diacetamide
39) 1-acetyl-4-(N-cyclohexylacetamido)-2,2,6,6-tetramethylpiperidine
40) 4-benzoylamino-2,2,6,6-tetramethylpiperidine
41) N,N'-bis(2,2,6,6-tetramethylpiperidin-4-yl)-N,N'-dibutyladipamide
42) N,N'-bis(2,2,6,6-tetramethylpiperidin-4-yl)-N,N'-dicyclohexyl-2-hydroxypropylene-1,3-diamine
43) N,N'-bis(2,2,6,6-tetramethylpiperidin-4-yl)-p-xylylenediamine
44) N,N'-bis(2,2,6,6-tetramethylpiperidin-4-yl) succindiamide
45) bis(2,2,6,6-tetramethylpiperidin-4-yl) N-(2,2,6,6-tetramethylpiperidin-4-yl)-β-aminodipropionate 46) the compound of formula

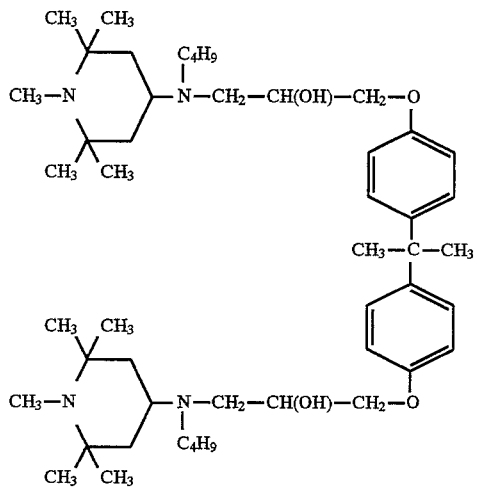

47) 4-[bis(2-hydroxyethylamino)]-1,2,2,6,6-pentamethylpiperidine
48) 4-(3-methyl-4-hydroxy-5-tert-butyl-benzamido)-2,2,6,6-tetramethylpiperidine
49) 4-methacrylamido-1,2,2,6,6-pentamethylpiperidine c) Compounds of formula (IV)

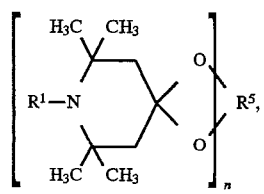  (IV)

wherein n is 1 or 2, $R^1$ is as defined under a) and $R^5$, if n is 1, is $C_2$–$C_8$alkylene or $C_2$–$C_8$hydroxyalkylene or $C_4$–$C_{22}$acyloxyalkylene, and, if n is 2, is the (—$CH_2$)$_2$C($CH_2$—)$_2$ group.

$R^5$ as $C_2$–$C_8$alkylene or $C_2$–$C_8$hydroxyalkylene may be ethylene, 1-methylethylene, propylene, 2-ethylpropylene or 2-ethyl-2-hydroxymethylpropylene.

$R^5$ as $C_4$–$C_{22}$acyloxyalkylene may be 2-ethyl-2-acetoxymethylpropylene.

Illustrative examples of polyalkylpiperidines of this class are the following compounds:

50) 9-aza-8,8,10,10-tetramethyl-1,5-dioxaspiro[5.5]undecane
51) 9-aza-8,8,10,10-tetramethyl-3-ethyl-1,5-dioxaspiro[5.5]undecane
52) 8-aza-2,7,7,8,9,9-hexamethyl-1,4-dioxaspiro[4.5]decane
53) 9-aza-3-hydroxymethyl-3-ethyl-8,8,9,10,10-pentamethyl-1,5-dioxaspiro[5.5]undecane
54) 9-aza-3-ethyl-3-acetoxymethyl-9-acetyl-8,8,10,10-tetramethyl-1,5-dioxaspiro[5.5]-undecane
55) 2,2,6,6-tetramethylpiperidine-4-spiro-2'-(1',3'-dioxane)-5'-spiro-5"-(1",3"-dioxane)-2"-spiro-4'"-(2'",2'",6'",6'"-tetramethylpiperidine).

d) Compounds of formulae VA, VB and VC

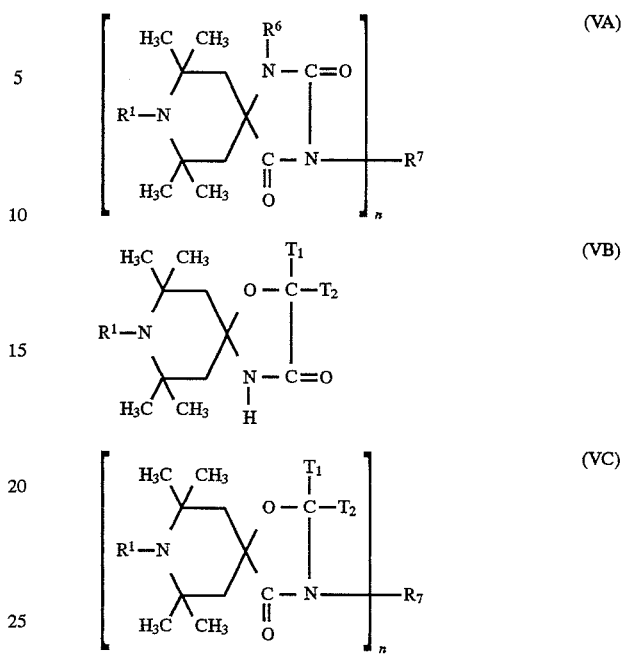

wherein n is 1 or 2, $R^1$ is as defined under a), $R^6$ is hydrogen, $C_1$–$C_{12}$alkyl, allyl, benzyl, glycidyl or $C_2$–$C_6$alkoxyalkyl, and $R^7$, if is 1, is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of formula —($CH_2$)$_p$—COO—Q or of formula —($CH_2$)p—O—CO—Q, wherein p is 1 or 2 and Q is $C_1$–$C_4$alkyl or phenyl, or if n is 2, is $C_2$–$C_{12}$alkylene, $C_4$–$C_{12}$alkenylene, $C_6$–$C_{12}$arylene, a —$CH_2$—CH(OH)—$CH_2$—O—D—O—$CH_2$—CH(OH)—$CH_2$— group, wherein D is $C_2$–$C_{10}$alkylene, $C_6$–$C_{15}$arylene, $C_6$–$C_{12}$cycloalkylene, or is a —$CH_2$CH(OZ')$CH_2$—(O$CH_2$—CH(OZ')$CH_2$)$_2$— group, wherein Z' is hydrogen, $C_1$–$C_{18}$alkyl, allyl, benzyl, $C_2$–$C_{12}$alkanoyl or benzoyl, $T_1$ and $T_2$ are each independently of the other hydrogen or $C_6$–$C_{10}$aryl or $C_7$–$C_9$aralkyl which may be substituted by halogen or $C_1$–$C_4$alkyl, or $T_1$ and $T_2$, together with the linking carbon atom, form a $C_5$–$C_{12}$cycloalkane ring.

Substituents defined as $C_1$–$C_{12}$alkyl may typically be methyl, ethyl, n-propyl, n-butyl, sec-butyl, tert-butyl, n-hexyl, n-octyl, 2-ethylhexyl, n-nonyl, n-decyl, n-undecyl or n-dodecyl.

Substituents defined as $C_1$–$C_{18}$alkyl may be the groups cited above and may additionally be n-tridecyl, n-tetradecyl, n-hexadecyl or n-octadecyl.

Substituents defined as $C_2$–$C_6$alkoxyalkyl may typically be methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$R^7$ as $C_3$–$C_5$alkenyl may be 1-propenyl, allyl, methallyl, 2-butenyl or 2-pentenyl.

$R^7$, $T_1$ and $T_2$ as $C_7$–$C_9$aralkyl are preferably phenethyl or, most preferably, benzyl. A cycloalkane ring formed by $T_1$ and $T_2$ together with the linking carbon atom may be a cyclopentane, cyclohexane, cyclooctane or cyclododecane ring.

$R^7$ as $C_2$–$C_4$hydroxyalkyl may be 2-hydroxyethyl, 2-hydroxypropyl, 2-hydroxybutyl or 4-hydroxybutyl.

$R^7$, $T_1$ and $T_2$ as $C_6$–$C_{10}$aryl are preferably phenyl, α- or β-naphthyl, which may be substituted by halogen or $C_1$–$C_4$alkyl.

$R^7$ as $C_2$–$C_{12}$alkylene may typically be ethylene, propylene, 2,2-dimethylpropylene, tetramethylene, hexamethylene, octamethylene, decamethylene or dodecamethylene.

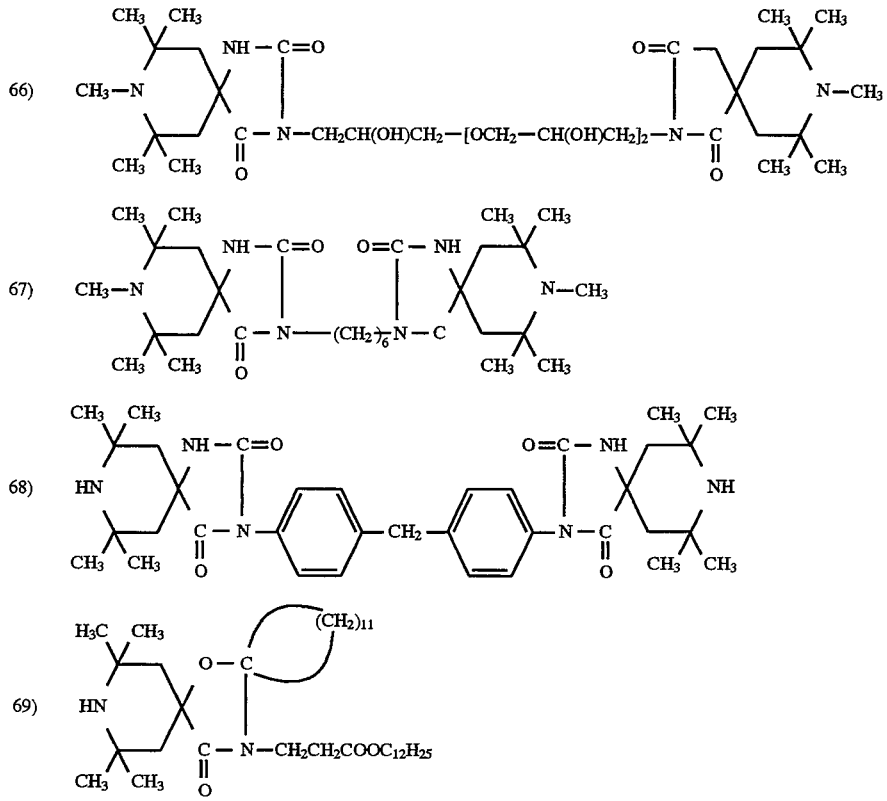

$R^7$ as $C_4$–$C_{12}$alkenylene is preferably 2-butenylene, 2-pentenylene or 3-hexenylene.

$R^7$ as $C_6$–$C_{12}$arylene is typically o-, m- or p-phenylene, 1,4-naphthylene or 4,4'-diphenylene.

Z' as $C_2$–$C_{12}$alkanoyl may be propionyl, butyryl, octanoyl, dodecanoyl, but is preferably acetyl.

D as $C_2$–$C_{10}$alkylene, $C_6$–$C_{15}$arylene or $C_6$–$C_{12}$cycloalkylene is as defined under b).

Illustrative examples of polyalkylpiperidines of this class are the following compounds:

56) 3-benzyl-1,3,8-triaza-7,7,9,9-tetramethylspiro[4.5]decane-2,4-dione
57) 3-n-octyl-1,3,8-triaza-7,7,9,9-tetramethylspiro[4.5]decane-2,4-dione
58) 3-allyl-1,3,8-triaza-1,7,7,9,9-pentamethylspiro[4.5]decane-2,4-dione
59) 3-glycidyl-1,3,8-triaza-7,7,8,9,9-pentamethylspiro[4.5]decane-2,4-dione
60) 1,3,7,7,8,9,9-heptamethyl-1,3,8-triazaspiro[4.5]decane-2,4-dione
61) 2-isopropyl-7,7,9,9-tetramethyl-1-oxa-3,8-diaza-4-oxo-spiro[4.5]decane
62) 2,2-dibutyl-7,7,9,9-tetramethyl-1-oxa-3,8-diaza-4-oxo-spiro[4.5]decane
63) 2,2,4,4-tetramethyl-7-oxa-3,20-diaza-21-oxo-dispiro[5.1.11.2]-heneicosane
64) 2-butyl-7,7,9,9-tetramethyl-1-oxa-4,8-diaza-3-oxo-spiro[4.5]decane
65) 8-acetyl-3-dodecyl-1,3,8-triaza-7,7,9,9-tetramethylspiro[4,5]decane-2,4-dione or the compounds of the following formulae:

e) Compounds of formula VI

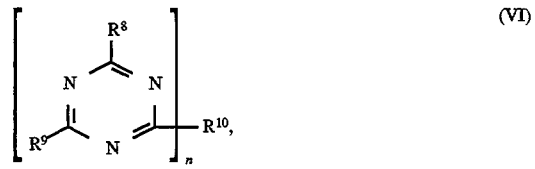

(VI)

wherein n is 1 or 2 and $R^8$ is a group of formula

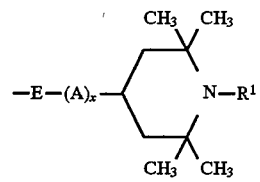

wherein $R^1$ is as defined under a), E is —O— or —$NR^{11}$, A is $C_2$–$C_6$alkylene or —$(CH_2)_3$—O— and x is 0 or 1, $R^9$ has the meaning of $R^8$ or is a group —$NR^{11}R^{12}$, —$OR^{13}$, —$NHCH_2OR^{13}$ or —$N(CH_2OR^{13})_2$, $R^{10}$, if n=1, has the meaning of $R^8$ or $R^9$, and, if n=2, is a group —E—B—E—, wherein B is $C_2$–$C_6$alkylene which may be interrupted by —$N(R^{11})$—, $R^{11}$ is $C_1$–$C_{12}$alkyl, cyclohexyl, benzyl or $C_1$–$C_4$hydroxyalkyl or a group of formula

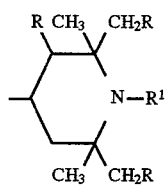

$R^{12}$ is $C_1$–$C_{12}$alkyl, cyclohexyl, benzyl, $C_1$–$C_4$hydroxyalkyl, and $R^{13}$ is hydrogen, $C_1$–$C_{12}$alkyl or phenyl, or $R^{11}$ and $R^{12}$, when taken together, are $C_4$–$C_5$alkylene or $C_4$–$C_5$oxaalkylene, typically

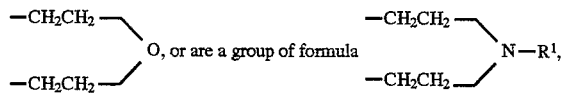

or $R^{11}$ and $R^{12}$ are also each a group of formula

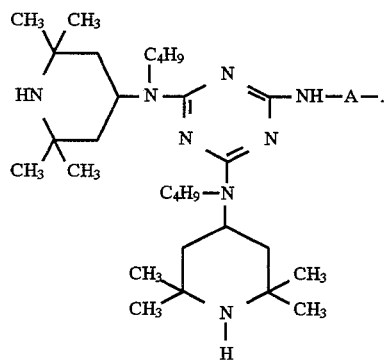

Substituents defined as $C_1$–$C_{12}$alkyl may typically be methyl, ethyl, n-propyl, n-butyl, sec-butyl, tert-butyl, n-hexyl, n-octyl, 2-ethylhexyl, n-nonyl, n-decyl, n-undecyl or n-dodecyl dar.

Substituents defined as $C_1$–$C_4$hydroxyalkyl may typically be 2-hydroxyethyl, 2-hydroxypropyl, 3-hydroxypropyl, 2-hydroxybutyl or 4-hydroxybutyl.

A as $C_2$–$C_6$alkylene may be ethylene, propylene, 2,2-dimethylpropylene, tetramethylene or hexamethylene.

$R^{11}$ and $R^{12}$ together as $C_4$–$C_5$alkylene or oxaalkylene may be tetramethylene, pentamethylene or 3-oxapentamethylene.

Illustrative examples of polyalkylpiperidines of this class are the compounds of the following formulae:

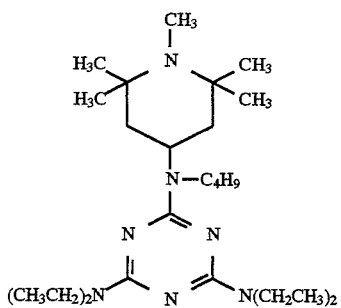

70)

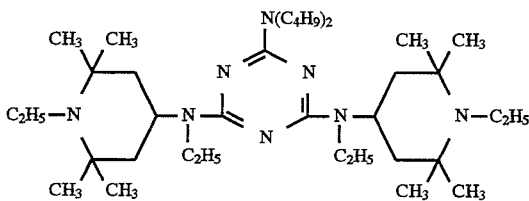

71)

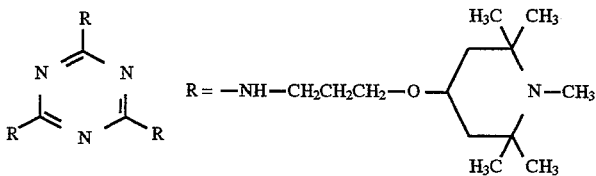

72)

-continued
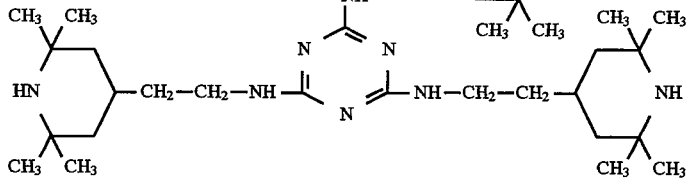
73)
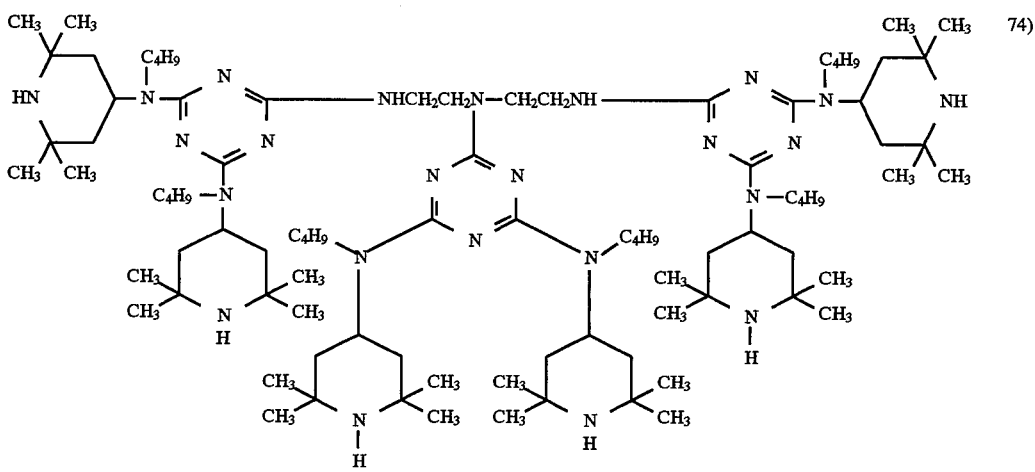
74)
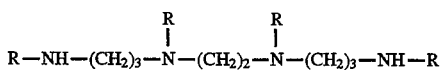
75)
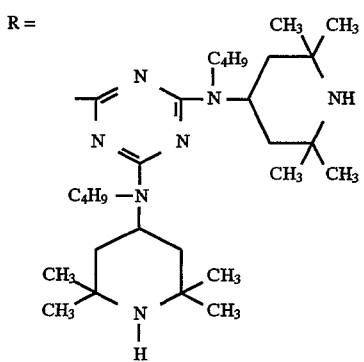
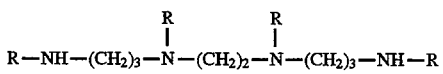
76)
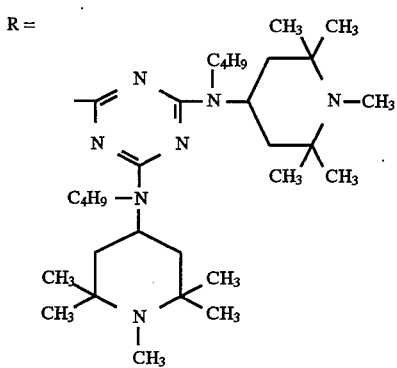

-continued

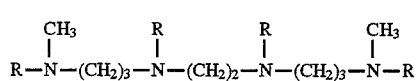

77)

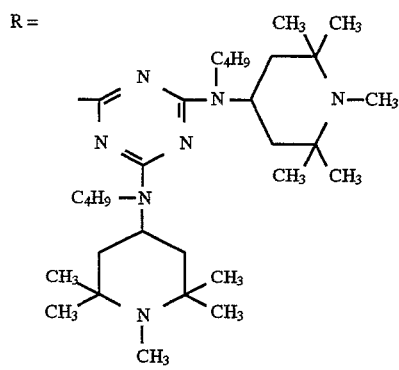

78)

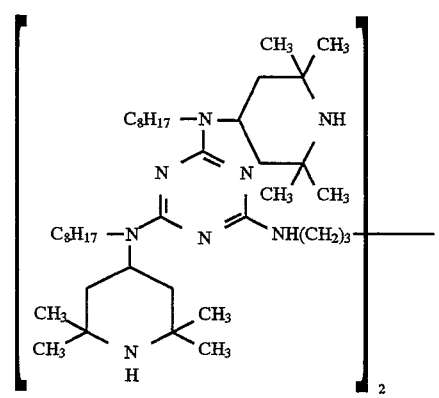

79)

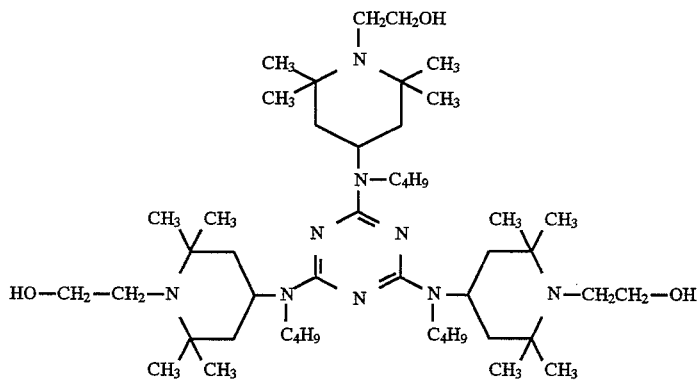

80)

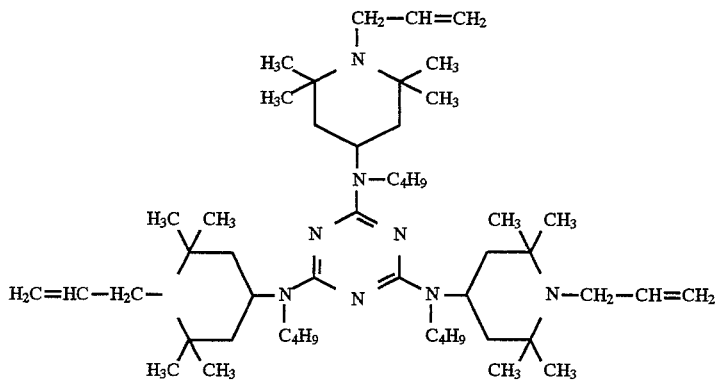

f) Oligomeric or polymeric compounds whose structural repeating unit contains one or more than one 2,2,6,6-tetraalkylpiperidine radical of formula (I), preferably polyesters, polyethers, polyamides, polyamines, polyurethanes, polyureas, polyaminotriazines, poly(meth) acrylates, polysiloxanes, poly(meth)acrylamides and their copolymers which contain such radicals.

Illustrative examples of 2,2,6,6-polyalkylpiperidine light stabilisers of this class are the compounds of the following formulae, wherein m is a number from 2 to about 200.

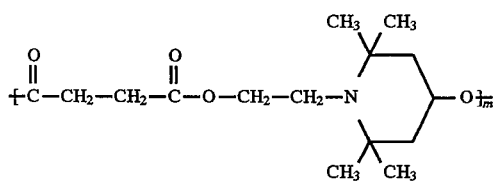
81)
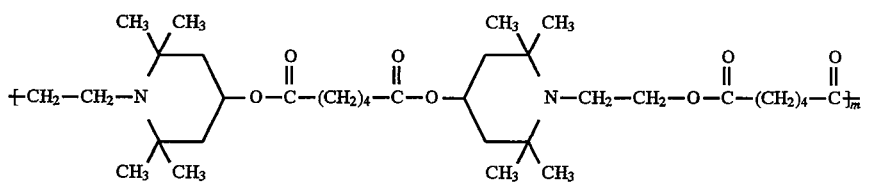
82)
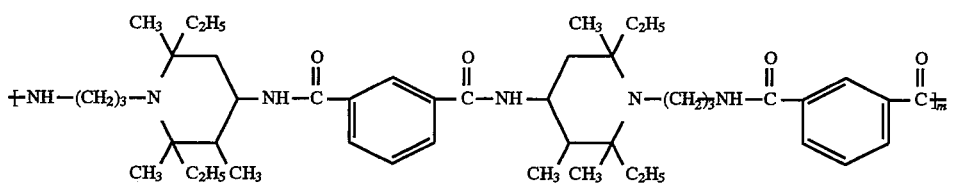
83)
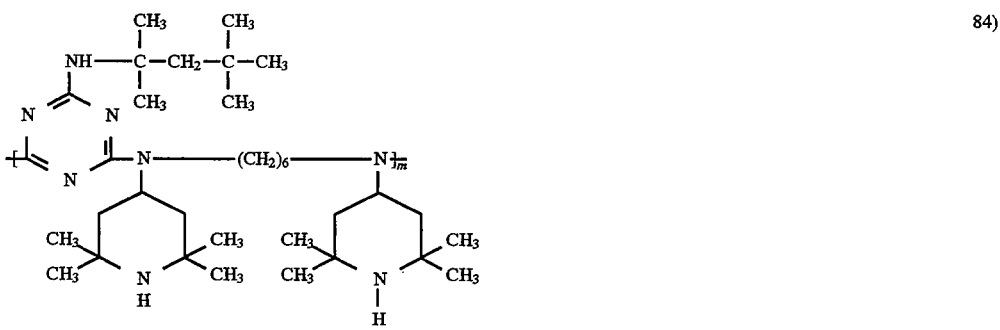
84)
85)
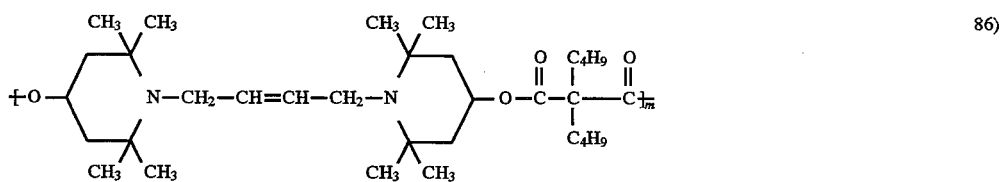
86)
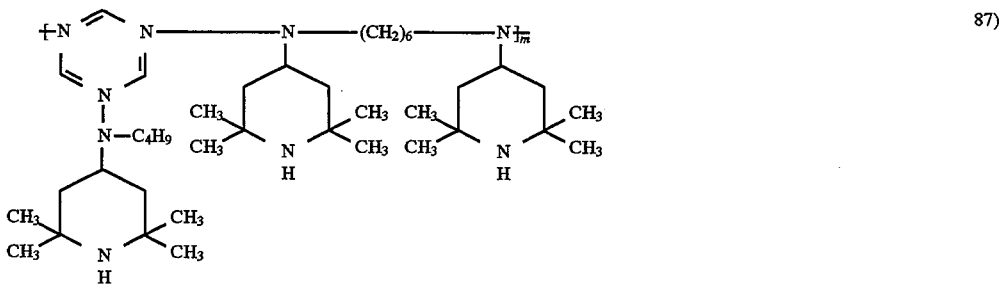
87)

-continued
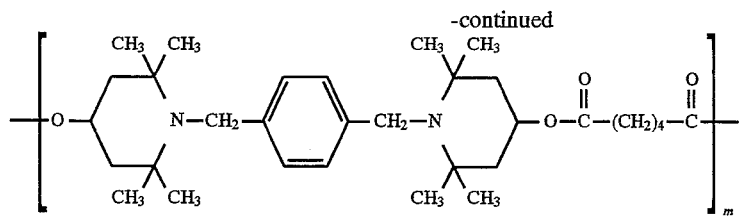
88)
89)
90)
91)
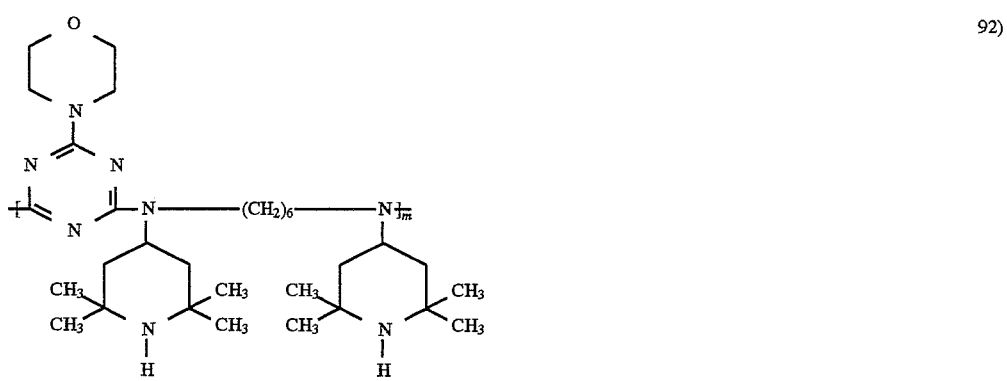
92)
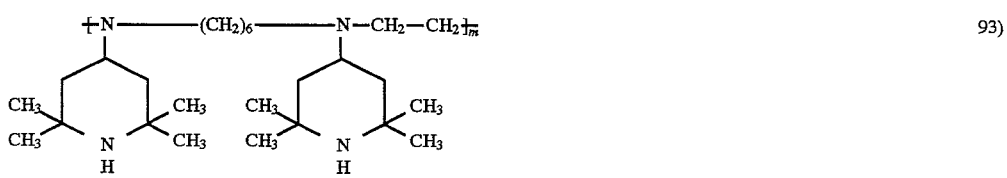
93)
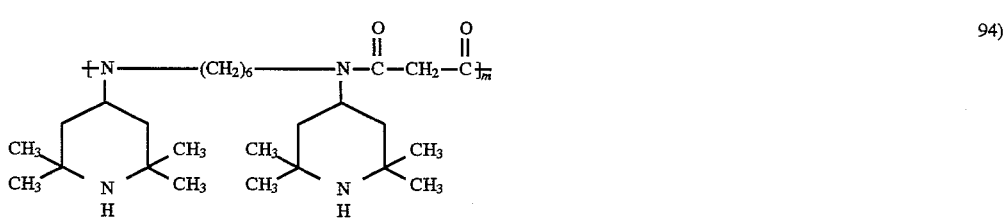
94)

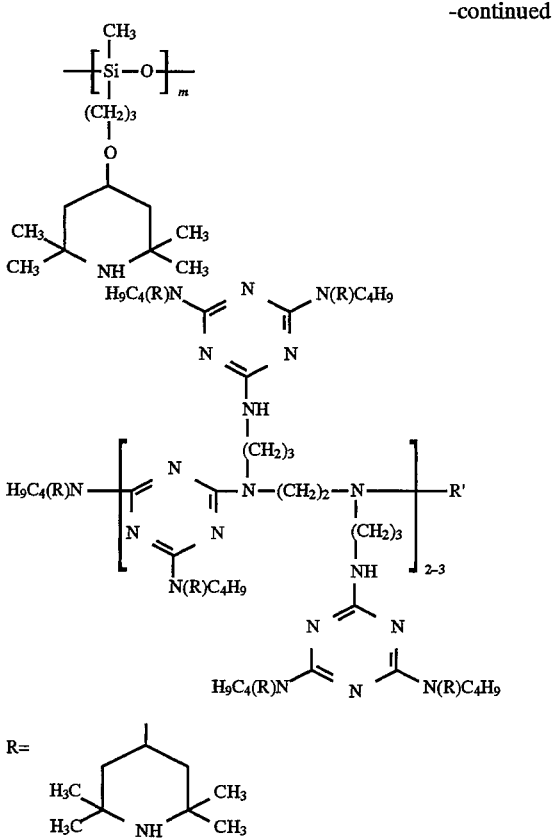

95)

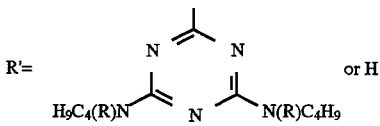

96)

Among these classes, classes e) and f) are especially suitable, in particular those tetraalkylpiperidines which contain s-triazine groups. Other particularly suitable compounds are compounds 74, 76, 84, 87, 92 and 95.

The amount of tetramethylpiperidine added will depend on the desired degree of stabilisation. Normally 0.01 to 0.5% by weight, preferably 0.05 to 0.3% by weight, based on the polymer, will be added.

The antioxidants of the type of the sterically hindered phenols added as optional further stabilisers to the polymerisation are commonly known antioxidants for organic materials and are often used for stabilising polymers. Illustrative examples of such phenol antioxidants are:

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

2. Alkylthiomethylphenols, for example 2,4-dioctylthiomethyl-6-tert-butylphenol, 2,4-di-octylthiomethyl-6-methylphenol, 2,4-dioctylthiomethyl-6-ethylphenol, 2,6-di-dodecylthiomethyl-4-nonylphenol.

3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

4. Tocopherols, for example α-tocopherol, β-tocopherol, γ-tocopherol, δ-tocopherol and mixtures thereof (vitamin E).

5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-methylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'- methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

8. Hydroxybenzylated malonates, for example dioctadecyl-2,2-bis(3,5-di-tert-butyl-2-hydroxybenzyl)malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, his[4-(1,1,3,3-tetramethylbutyl)phenyl]-2,2-bis(3,5-di-tert-butyl-4-hydroxybenzyl)malonate.

9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

12. Acylaminophenols, for example 4-hydroxylauranilide, 4-hydroxystearanilide, octyl N-(3,5-di-tert-butyl-4-hydroxyphenyl)carbamate.

13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

14. Esters of β-(5-tert-butyl-4-hydroxy-3-methylphenyl)propionic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl- 1-phospha-2,6,7-trioxabicyclo[2.2.2]octane.

16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

17. Amides of 13-(3,5-di-tert-butyl-4-hydroxyphenyl)propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

Preferred antioxidants are those listed in 7, 9, 10, 13, 14, 15 and 17, especially 7, 9, 10 and 13. Particularly suitable antioxidants are octadecyl β-(3,5-di-tert-butyl-4-hydroxyphenyl)propionate, tocopherol and 1,3,5-tris(3,5-di-tert-butyl-4-hydroxybenzyl)-2,4,6-trimethylbenzene.

The amount of antioxidant added will depend on the mount of the aminoalkyl-1,1'-biphenyl-2,2'-diylphosphite or aminoalkyl-2,2'-alkylidene-bis(phenyl)phosphite. Normally 0.005 to 0.5% by weight, preferably 0.01 to 0.1% by weight, based on the polymer, is added.

Compounds which may be used according to the practice of this invention of the series of the hydrotalcites, zeolites, metal soaps, metal carbonates or metal oxides are the naturally occurring minerals as well as synthetic compounds.

Compounds of the series of the hydrotalcites may be illustrated by the general formula X,

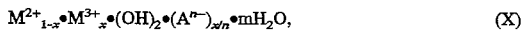

(X)

wherein $M^{2+}=Mg^{2+}$, $Ca^{2+}$, $Sr^{2+}$, $Ba^{2+}$, $Zn^{2+}$, $Cd^{2+}$, $Pb^{2+}$, $Sn^{2+}$ and/or $Ni^{2+}$, $M^{3+}=Al^{3+}$, $B^{3+}$ or $Bi^{3+}$, $A^{n-}$ is an anion of valency n, n is a number from 1 to 4, x is a number from 0 to 0.5, and m is a number from 0 to 2.

$A^{n-}$ is preferably $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$, $$\begin{array}{c}\text{COO}^-\\|\\\text{COO}^-,\end{array}$$

$(\text{CHOHCOO})_2{}^{2-}$, $(\text{CHOH})_4\text{CH}_2\text{OHCOO}^-$, $\text{C}_2\text{H}_4(\text{COO})_2{}^{2-}$, $(\text{CH}_2\text{COO})_2{}^{2-}$, $\text{CH}_3\text{CHOHCOO}^-$, $\text{SiO}_3{}^{2-}$, $\text{SiO}_4{}^{4-}$, $\text{Fe(CN)}_6{}^{3-}$, $\text{Fe(CN)}_6{}^{4-}$, or $\text{HPO}_4{}^{2-}$.

Other hydrotalcites, which may conveniently be used in the process described above are compounds of the general formula Xa $$M_x{}^{2+}Al_2(OH)_{2x+6nz}(A^{n-})_2 \cdot mH_2O, \qquad (Xa)$$

wherein, in this formula Xa, $M^{2+}$ is at least one metal of the series of Mg and Zn, $Mg^{2+}$ being preferred, $A^{n-}$ is an anion, typically of the series of $CO_3{}^{2-}$, $$\begin{pmatrix}\text{COO}\\|\\\text{COO}\end{pmatrix}^{2-},$$

$OH^-$ and $S^{2-}$, and n is the valency of the artion, m is a positive number, preferably from 0.5 to 5, and x and z are positive numbers, and x is preferably 2 to 6, and z is smaller than 2.

Preferred and commercially available hydrotalcites are DHT-4A and DHT-4C supplied by Kyowa, Japan.

Preferred compounds of the series of the hydrotalcites are those of the general formula X, $$M_{2+1-x} \cdot M^{3+}{}_x \cdot (OH)_2 \cdot (A^{n-})_{x/n} \cdot mH_2O, \qquad (X)$$

wherein $M^{2+}$ is $Mg^{2+}$ or a solid solution of Mg and Zn, $A^{n-}$ is $CO_3{}^{2-}$, x is a number from 0 to 0.5, and m is a number from 0 to 2.

Particularly preferred hydrotalcites are those of formulae $Al_2O_3 \cdot 6MgO \cdot CO_2 \cdot 12H_2O$, $Mg_{4.5}Al_2(OH)_{13} \cdot CO_3 \cdot 3,5H_2O$, $4MgO \cdot Al_2O_3 \cdot CO_2 \cdot 9H_2O$, $4MgO \cdot Al_2O_3 \cdot CO_2 \cdot 6H_2O$, $ZnO \cdot 3MgO \cdot Al_2O_3 \cdot CO_2 \cdot 8-9H_2O$ or $ZnO \cdot 3MgO \cdot Al_2O_3 \cdot CO_2 \cdot 5-6H_2O$.

In the practice of this invention it is also possible to use zeolites of the general formula (XI)

$$M_{x/n}[(AlO_2)_x(SiO_2)_y] \cdot wH_2O, \qquad (XI)$$

wherein n is the charge of the cation M,
M is an element of the first or second main group of the Periodic Table,
y:x is a number from 0.8 to 1.2, and
w is a number from 0.5 to 10.

The preferred per se known zeolites which may be used in the above process have an average pore diameter of 3–5 Å, including those of the NaA type that have an average effective pore diameter of 4 Å, for which reason they are also called 4 Å zeolites.

Illustrative examples of suitable zeolites are the compounds:

$Na_{12}[(AlO_2)_{12}(SiO_2)_{12}] \cdot 12H_2O$ $Ca_{4.5}Na_3[(AlO_2)_{12}(SiO_2)_{12}] \cdot 30H_2O$ $K_9Na_3[(AlO_2)_{12}(SiO_2)_{12}] \cdot 27H_2O$.

Preferred and commercially available zeolites are molecular sieves.

In the practice of this invention it is also possible to use metal soaps. Preferred metal soaps are those of divalent metals with fatty acids containing 8 to 28 carbon atoms. The metal soaps of calcium are particularly preferred, and calcium stearate and calcium pelargonate are most preferred.

Metal carbonates or metal oxides can also be used in the process of this invention. Oxides of divalent metals are preferred. Oxides of the metals of the second main group or auxiliary group of the Periodic Table are particularly preferred, and zinc and magnesium oxide is most preferred.

The novel compounds of this invention are dried to remove the unbound or only loosely bound water at 50° to 800° C., preferably 80° to 400° C., provided they are not already sufficiently dry and have been stored under anhydrous conditions. Drying can be carded out under vacuum or inert gas. The surfaces of the substances can be treated with surface-active reagents such as carboxylic acids or linear alcohols of 8 or more carbon atoms, conveniently stearic acid.

The compounds of the series of the hydrotalcites, zeolites, metal soaps, metal carbonates, metal oxides or similar synthetically prepared compounds that do not release water under the reaction conditions are normally added in an amount of 0.005 to 0.2% by weight, preferably in an amount of 0.01 to 0.1% by weight, based on the polymer.

The invention also relates to the use of the aminoalkyl-1,1'-biphenyl-2,2'-diylphosphites or aminoalkyl-2,2'-alkylidene-bis(phenyl)phosphites defined in more detail above, in a process for the polymerisation of olefins using a transition metal catalyst for stabilising the polymers obtainable in this manner. The preferences stated with respect to the process apply here likewise.

The polyolefins obtainable according to the process defined in more detail above are a further object of this invention. The preferences stated with respect to the process apply here likewise.

The polyolefins prepared according to this invention are particularly suitable for the preparation of semi finished products (plates, tubes and profiles of any diameter) and for the following processes of preparation: rotation moulding, centrifugal casting, injection moulding, thermoplastic foam moulding, transfer moulding, pressing, sintering, calandering, extrusion, hollow body blow moulding, extrusion stretch blow moulding, slush casting, spinning, foaming, powder coating, coating and cable coating.

The invention is illustrated in more detail by the following Examples in which, as also in the description and claims, parts and percentages are by weight, and "+" is a tert-butyl radical, unless otherwise stated.

Additives used in the Examples:

AP-1:
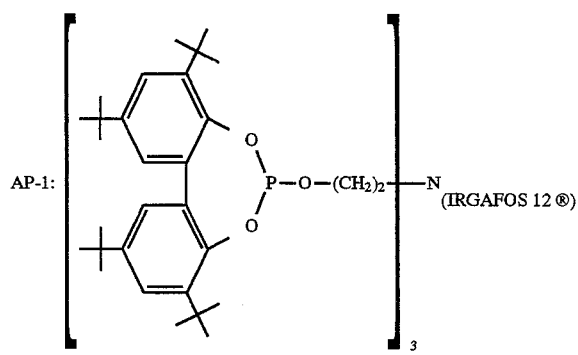
(IRGAFOS 12 ®)

in comparison:

VP-1: tris(2, 4-di-tert-butylphenyl) phosphate(IRGAFOS 168 ®)

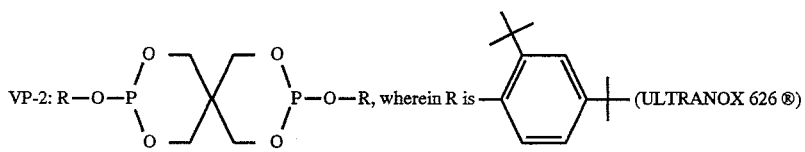
VP-2: (ULTRANOX 626 ®)

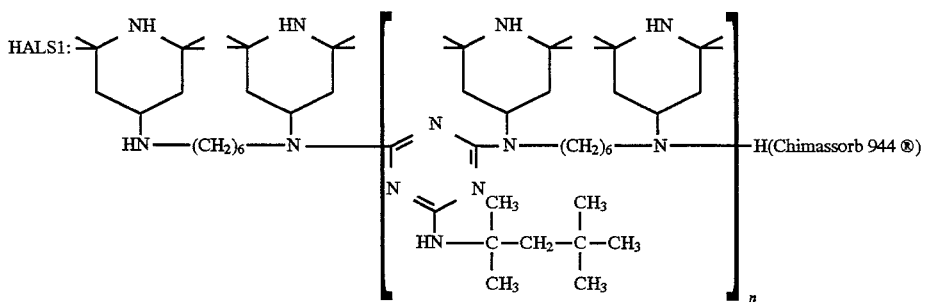
HALS1: H(Chimassorb 944 ®)

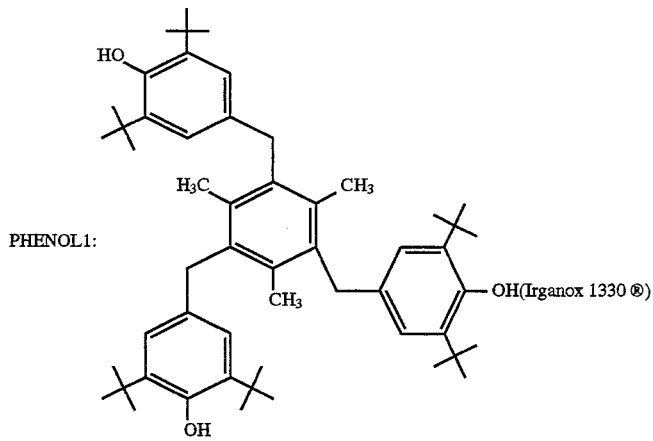
PHENOL1: OH(Irganox 1330 ®)

EXAMPLE 1

Propylene Polymerisation 2 ml of 1,3-dimethoxy-2,2-diisobutylpropane, 30 ml of toluene and 30 ml of titanium tetrachloride are added to 2 g of magnesium ethylate $(Mg(OC_2H_5)_2)$ at room temperature. With stirring, the suspension is heated to 130° C., then stirred at this temperature for 30 minutes and filtered hot. The residue is taken up in 30 ml of toluene and 20 ml of titanium tetrachloride, stirred for 30 minutes at 130° C. and filtered hot. The residue is then washed five times with 50 ml of hexane and dried. The catalyst contains 2% of titanium, 15% of magnesium, 58% of chlorine.

A 3 liter steel autoclave is evacuated for 30 minutes at 110° C. and then flushed with gaseous propylene at this temperature. The autoclave is cooled to 20° C. and the additives (in powdered form) and the catalyst (30 mg, contacted previously with 0.4 ml of triethylaluminium in 25 ml of hexane over 10 min) are added in succesion. The autoclave is closed, a hydrogen pressure of 0.1 bar is applied and 650 g of liquid propylene are added. The stirrer is turned on and the temperature is raised to 70° C. After 4 hours, the pressure in the autoclave is released and 10 ml of isopropanol are added and stirring is continued for 30 min at 70° C. The polymer is removed from the autoclave and dried overnight under vacuum at 80° C. Yield: 300 g.

500 g of the polypropylene so obtained are extruded three times with the addition of 0.1% of Irganox 1010 and 0.1% of calcium stearate in a Göttfert extruder with an on-line viscosimeter (1=400 mm, d=20 mm, c. 50 rpm, cooled inlet, 260°, 270°, 280° C., residence time 90 sec).

The granulate is moulded at 230° C. to 1 mm panels. The panels are kept immersed in water of 90° C., and yellowing is assessed.

The novel sample stabilised with 0.1% of AP-1 has excellent processing properties and shows markedly less discoloration in comparison with the unstabilised sample and with the sample stabilised with 0.1% of VP-1 or VP-2.

Table of the propylene polymerisations:

| Example | Additive | Amount [mg] | PP Yield g | I.I. |
|---|---|---|---|---|
| 1a | none | 0 | 305 | 95 |
| 1b | Irgafos 12 | 150 | 310 | 95 |
| 1c | Irgafos 168 | 150 | 300 | 95 |
| 1d | Ultranox 626 | 150 | 305 | 95 |
| 1e | Irgafos 12+ Chimassorb 944 | 150+ 300 | 300 | 95 |
| 1f | Irgafos 12+ Irganox 1330 | 150+ 150 | 350 | 95 |

I.I. Isotacticity index (% of the PP insoluble in boiling heptane)
Irgafos 12 does not influence the polymerisation.
Long-term heat stability test: Oven ageing at 135° C.
The 5 PP samples are extruded three times in a single-screw extruder. The temperature in the last zone is 280° C. Each sample is further stabilised with 0.1% of Irganox 1010® (pentaerythrityltetrakis-(3-[3',5'-di-tert-butyl-4'-hydroxyphenyl]propionate) and 0.1% of calcium stearate.

| Ex. | Additive | YI 1x | YI 3x | LTTS 1x |
|---|---|---|---|---|
| 1a | none | 6.3 | 7.7 | 42 |
| 1b | Irgafos 12 | 5.3 | 6.7 | 78 |
| 1c | Irgafos 168 | 6.5 | 7.3 | 49 |
| 1d | Ultranox 626 | 6.2 | 8.6 | 53 |

YI: Yellowness Index (measured in 2 mm panels)
LTTS (days at 135° C.): oven ageing at 135° C. (1 mm panels from samples of the first extrusion)
The sample stabilised with Irgafos 12 shows best colour and best stability in oven ageing at 135° C.
Immersion in water at 90° C.:

| Ex. | Additive | YI 0 | YI 1 | YI 2 | YI 4 |
|---|---|---|---|---|---|
| 1a | none | 6.3 | 26.1 | 37.2 | 51.2 |
| 1b | Irgafos 12 | 5.3 | 13.2 | 17.7 | 26.7 |
| 1c | Irgafos 168 | 6.5 | 25.8 | 39.2 | 56.3 |
| 1d | Ultranox 626 | 6.2 | 17.9 | 29.8 | 50.3 |

YI: Yellowness Index after immersion in water for 0, 1, 2 and 4 weeks.
The sample stabilised with Irgafos 12 shows least discoloration when kept immersed in hot water.

EXAMPLE 2

Ethylene Polymerisation using a Ziegler Catalyst 30 ml of toluene and 30 ml of titanium tetrachloride are added to 2 g of magnesium ethylate (Mg(OC$_2$H$_5$)$_2$) at room temperature. With stirring, the suspension is heated to 130° C., then stirred at this temperature for 30 minutes and filtered hot. The residue is taken up in 30 ml of toluene and 30 ml of titanium tetrachloride, stirred for 30 minutes at 130° C. and filtered hot. The residue is then washed five times with 50 ml of hexane and dried. The catalyst contains 2% of titanium, 15% of magnesium, 58% of chlorine.

A 3 liter steel autoclave is evacuated for 30 minutes at 110° C. and then flushed with ethylene at this temperature. The autoclave is cooled to 20° C. and then 1 liter of heptane, the additives (in powdered form) and the catalyst (30 mg, contacted previously with 0.4 ml of triethylaluminium in 25 ml of hexane over 10 min) are added in succession. The autoclave is closed, a hydrogen pressure of 2 bar is applied and ethylene is added until a total pressure of 10 bar is reached. The stirrer is turned on and the temperature is raised to 80° C. After 4 hours, the pressure in the autoclave is released and 10 ml of isopropanol are added and stirring is continued for 30 min at 70° C. The polymer is removed from the autoclave, hexane is removed on a rotovap and the polymer is dried overnight under vacuum at 80° C. Yield: 200 g.

38 g of the polyethylene so obtained are kneaded with the addition of 0.1% of Irganox 1010 and 0.1% of calcium stearate for 10 minutes in a Brabender plastograph at 180° C. This stock is then moulded at 200° C. to a 1 mm panel and kept immersed in water of 90° C. The resultant yellowing is assessed.

EXAMPLE 3

Ethylene Polymerisation using a Phillips Catalyst

A catalyst with 1% Cr on silica gel is activated with oxygen at 900° C.

A 3 liter steel autoclave is evacuated for 30 minutes at 110° C. and then flushed with ethylene at this temperature. The autoclave is cooled to 20° C. and then 1 liter of heptane, the additives (in powdered form) and c. 100 mg of the catalyst are added. The autoclave is closed and ethylene is added until a total pressure of 14 bar is reached. The stirrer is turned on and the temperature is raised to 90° C. After 8 hours, the pressure in the autoclave is released and 10 ml of isopropanol are added and stirring is continued for 30 min at 70° C. The polymer is removed from the autoclave, hexane is removed on a rotovap and the polymer is dried overnight under vacuum at 80° C. Yield: 200 g.

38 g of the polyethylene so obtained are kneaded with the addition of 0.1% of Irganox 1010 and 0.1% of calcium stearate for 10 minutes in a Brabender plastograph at 180° C. This stock is then moulded to a 1 mm panel at 200° C. and kept immersed in water of 90° C. The resultant yellowing is assessed.

The novel sample stabilised with 0.1% of AP-1 has excellent processing properties and shows markedly less discoloration in comparison with the sample stabilised with 0.1% of VP-1.

Table of the ethylene polymerisations
200 mg of Cr catalyst (1% Cr on silica gel):

| Ex. | Additive | Amount | Yield | 3a Irgafos 12 300 190 3b |
|---|---|---|---|---|
| Irgafos | 300 | 230 | 168 | |

Immersion in water at 90° C.

0.1% of Irganox 1010 and 0.1% of calcium stearate are incorporated in a Brabender plastograph and moulded in a hot press to 2 mm panels. The panels are kept immersed in water of 90° C.

| Ex. | Additive | YI 0 | YI 2 | YI 4 |
|---|---|---|---|---|
| 3a | Irgafos 12 | 3.7 | 15.4 | 18.1 |
| 3b | Irgafos 168 | 4.4 | 27.9 | 35.0 |

The sample stabilised with Irgafos 12 shows markedly less yellowing than the comparison sample.

What is claimed is:

1. A process for the preparation of olefin polymers by polymerisation using a transition metal catalyst, which comprises carrying out the polymerisation by adding at least one compound of formula

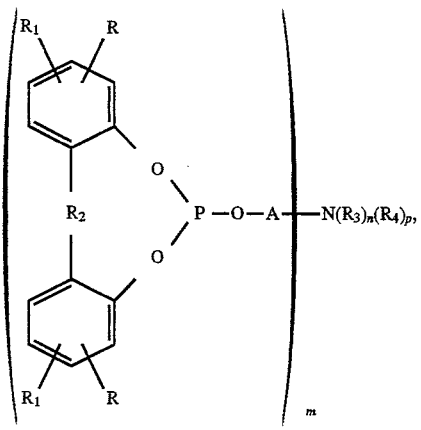

wherein
n=1 and p=1, if m=1;
n=1 and p=0, if m=2;
and n and p=0, if m=3;
and wherein R is an alkyl group of 1 to 18 carbon atoms;
$R_1$ is hydrogen or an alkyl group of 1 to 18 carbon atoms;
$R_2$ is a direct bond or alkylene of 1 to 12 carbon atoms;
A is alkylene of 1 to 6 carbon atoms, or cycloalkylene of 5 or 6 carbon atoms;
$R_3$ is alkyl of 1 to 18 carbon atoms, or

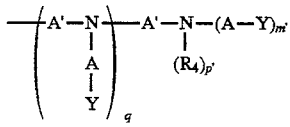

wherein Y is

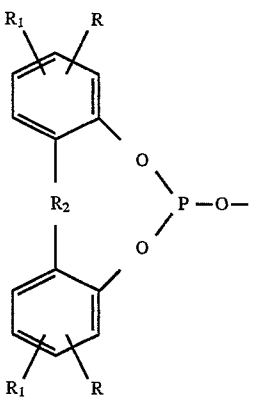

and
A' is alkylene of 1 to 6 carbon atoms, or cycloalkylene of 5 or 6 carbon atoms;
m' is 1 or 2;
p' is 0 or 1; and
q is 0 to 5; and
A, R, $R_1$ and $R_2$ have the meaning given above, with the proviso that, if p, p' and q are 0, then —N—A'—N is a diazacycloalkyl group containing 2 to 10 carbon atoms or, if m is 1 and p is 0, then N—$R_3$ is an azacycloalkyl group containing 2 to 10 carbon atoms or an azaoxacycloalkyl group containing 3 to 7 carbon atoms;

and $R_4$ is alkyl of 1 to 18 carbon atoms.

2. A process according to claim 1, wherein in the compound of formula (I) R in the phenyl ring is in ortho-position to the oxygen.

3. A process according to claim 1, wherein in the compound of formula (I) $R_1$ in the phenyl ring is in para-position to the oxygen.

4. A process according to claim 1, wherein in the compound of formula (I) m is 1, 2 or 3; R is $C_1$–$C_4$alkyl; $R_1$ is $C_1$–$C_8$alkyl; $R_2$ is a direct bond, methylene or ethylidene; and $R_3$ and $R_4$ are $C_1$–$C_4$alkyl.

5. A process according to claim 1, which comprises using from 0.005 to 0.5% by weight, preferably from 0.02 to 0.2% by weight, of the compound of formula (I), based on the polymer.

6. A process according to claim 1, which comprises adding as additional stabiliser during the polymerisation at least one 2,2,6,6,-tetramethylpiperidine compound or at least one sterically hindered phenol or at least one compound of the series of the hydrotalcites, zeolites, metal soaps, metal carbonates or metal oxides that does not release water under the reaction conditions, combinations of the additional stabilisers/additives also being possible.

7. A process according to claim 1, which comprises using as additional stabiliser a compound of the following formula

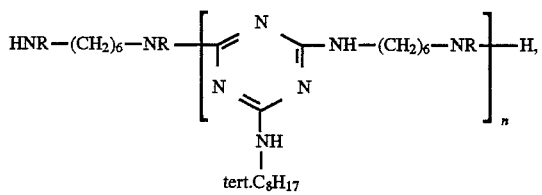

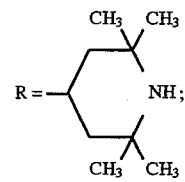

$\bar{M}_n > 2500$

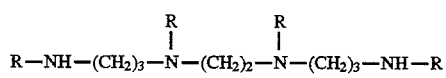

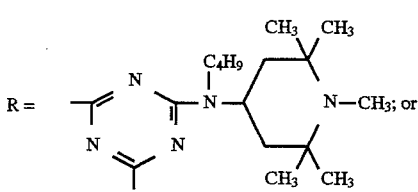

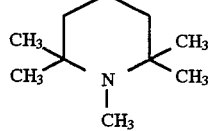

-continued

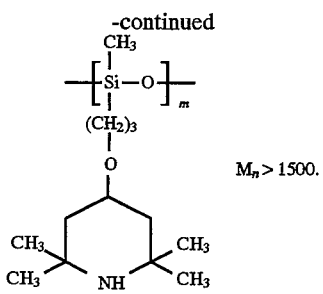

$M_n > 1500.$

8. A process according to claim 1, which comprises using as additional stabiliser an antioxidant of the sterically hindered phenol type.

9. A process according to claim 1, which comprises using as additional stabiliser octadecyl β-(3,5-di-tert-butyl-4-hydroxyphenyl)propionate, tocopherol or 1,3,5-bis(3,5-di-tert-butyl-4-hydroxybenzyl)-2,4,6-trimethylbenzene.

10. A process according to claim 1, wherein a hydrotalcite is further added during the polymerisation.

11. A stabilised polyolefin obtained by by polymerisation using a transition metal catalyst, which comprises carrying out the polymerisation by adding at least one compound of formula

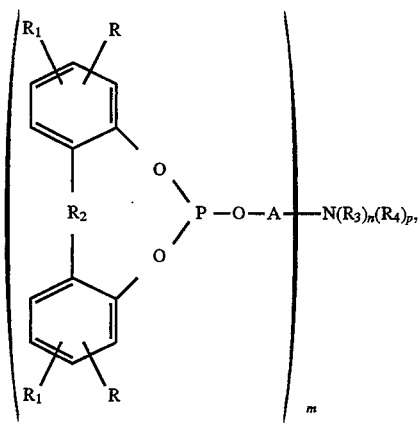  (I)

wherein
n=1 and p=1, if m=1;
n=1 and p=0, if m=2;
and n and p=0, if m=3;
and wherein R is an alkyl group of 1 to 18 carbon atoms;

$R_1$ is hydrogen or an alkyl group of 1 to 18 carbon atoms;
$R_2$ is a direct bond or alkylene of 1 to 12 carbon atoms;
A is alkylene of 1 to 6 carbon atoms, or cycloalkylene of 5 or 6 carbon atoms;
$R_3$ is alkyl of 1 to 18 carbon atoms, or

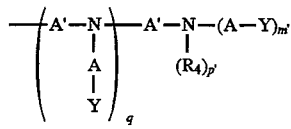

wherein Y is and A' is alkylene of 1 to 6 carbon atoms, or cycloalkylene of 5 or 6 carbon atoms;
m' is 1 or 2;
p'is 0 or 1; and
q is 0 to 5; and
A, R, $R_1$ and $R_2$ have the meaning given above, with the proviso that, if p, p' and q are 0, then —N—A'—N is a diazacycloalkyl group containing 2 to 10 carbon atoms or, if m is 1 and p is 0, then N—$R_3$ is an azacycloalkyl group containing 2 to 10 carbon atoms or an azaoxacycloalkyl group containing 3 to 7 carbon atoms;
and $R_4$ is alkyl of 1 to 18 carbon atoms.

12. A stabilised polyethylene or polypropylene according to claim 11 of high molecular weight.

* * * * *